United States Patent [19]

Ganske

[11] 3,773,276

[45] Nov. 20, 1973

[54] SELF-THREADING LEADER FOR TAPE ROLL

[75] Inventor: Kingston E. Ganske, Columbus, Ind.

[73] Assignee: Arvin Industries, Inc., Columbus, Ind.

[22] Filed: Oct. 28, 1968

[21] Appl. No.: 770,946

[52] U.S. Cl. ...................... 242/192, 206/53, 242/74, 242/195, 242/210, 274/41.4

[51] Int. Cl. ...................... G11b 15/66, B65h 75/28

[58] Field of Search .................... 242/192, 197, 195, 242/198, 21 B, 74, 71.8; 274/4, 11, 41.4; 206/53

[56] References Cited

UNITED STATES PATENTS

| | | | |
|---|---|---|---|
| 1,747,656 | 2/1930 | Ausloos et al. | 206/53 UX |
| 1,839,407 | 1/1932 | Mercer | 206/53 |
| 3,030,231 | 4/1962 | Bar | 242/74 X |
| 3,468,497 | 9/1969 | Kelley | 242/192 |

*Primary Examiner*—George F. Mautz
*Attorney*—Marechal, Biebel, French & Bugg

[57] ABSTRACT

A roll of recording tape has a flexible leader attached to its outer end, and the leader has flanges with independently flexible teeth extending to one side and spaced to embrace the outermost layers of the roll. The leader will likewise grip a take-up hub in a self-threading transport system. The teeth taper inward and can grip the tape pack of can grip into a recess formed in the hub rim.

11 Claims, 7 Drawing Figures

PATENTED NOV 20 1973

3,773,276

INVENTOR

KINGSTON E. GANSKE

BY

Marechal, Biebel, French & Bugg

ATTORNEYS

SELF-THREADING LEADER FOR TAPE ROLL

BACKGROUND OF THE INVENTION

This invention relates to self-threading systems for handling rolls of record tape, such as magnetic recording tape. Particularly where intended for consumer use, it is desirable to provide such systems, in order to minimize inexperienced handling of the tape, as in threading, packing, etc. Proposals have been made for various mechanical catches, grippers, etc. on the take-up hub, but in situations where the take-up roll must be smooth and free from bumps, these devices are not desirable. One suggestion to overcome the foregoing disadvantages has been to employ a leader with an adhesive surface. However this is impractical from the standpoint of deterioration of the adhesive due to aging, drying, etc. The present invention offers a different and practical solution to the problem.

SUMMARY OF THE INVENTION

A leader which can automatically grip the outermost layers of tape on a roll, or grip the edge of a take-up hub, is provided by this invention. The leader is readily adaptable to self-threading transports, and is reliable over the useful life of the tape. It is formed to a length corresponding to the circumference of the take-up hub, thus forms a layer of uniform thickness which avoids bumps in overlying layers of the thinner tape.

The leader is formed with a flexible body having outwardly extending edges forming flanges, preferably toothed, which grip the hub over a substantial part of its periphery and provide a firm engagement for high speed transporting and handling of the tape.

The primary object of the invention is to provide such a leader; to provide a take-up hub with grooves adapted to assist the gripping action of the leader; and thus to provide a novel self-threading arrangement for record tape.

Other objects and advantages of the invention will be apparent from the following description, the accompanying drawings and the appended claims.

DESCRIPTION OF THE PREFERRED EMBODIMENT

Figures 1, 2:
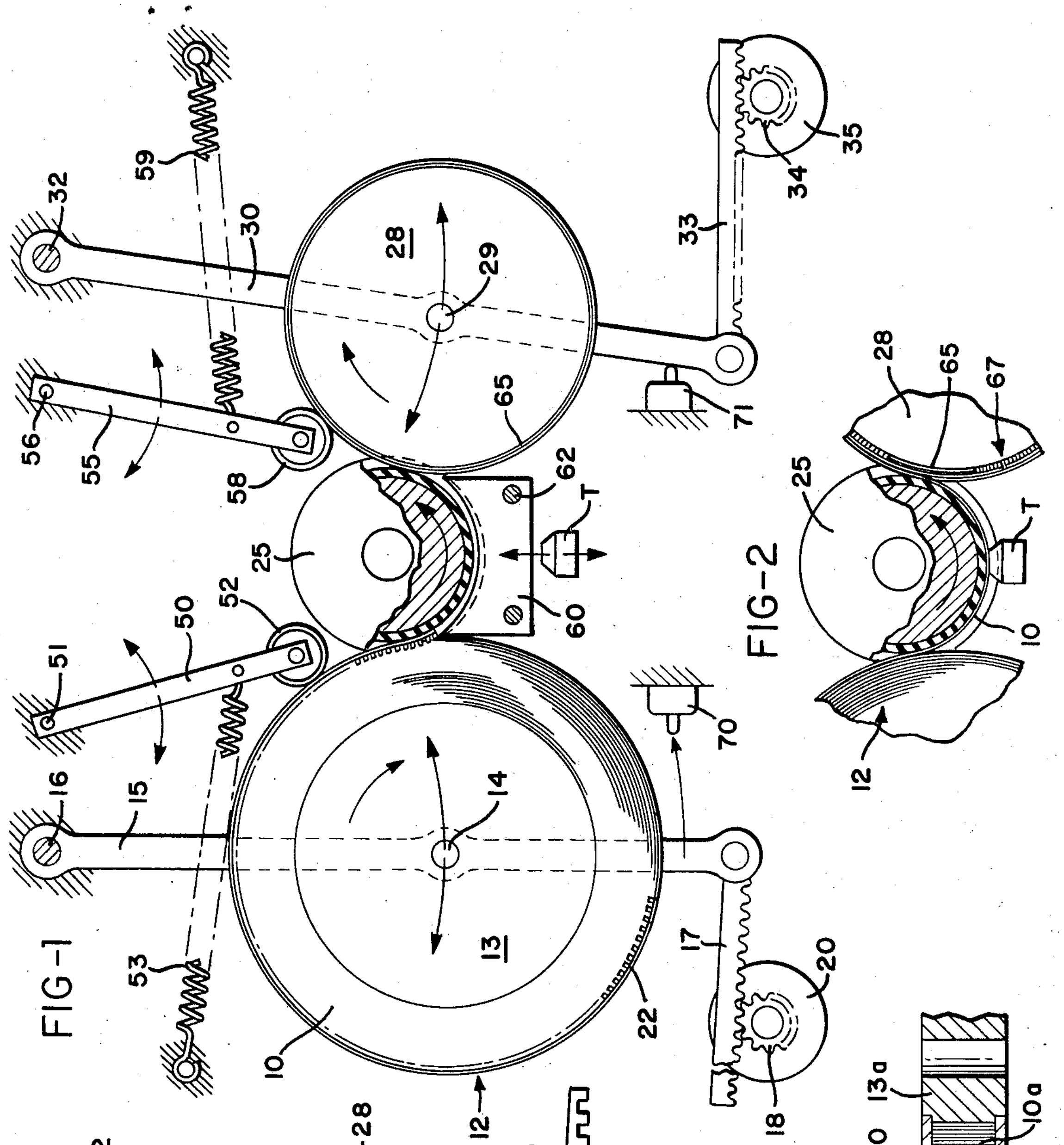
FIG. 1 is a diagrammatic plan view of a transport including a roll of record tape with the novel leader.
FIG. 2 is a fragmentary view similar to FIG. 1, showing the leader and part of the tape roll wound on a take-up hub.

FIG. 1 shows a quantity of magnetic recording tape 10 wound as a supply roll 12 on a supply hub 13 mounted on a spindle 14 which is carried on an arm 15 pivotally mounted at 16. A rack 17 is linked to the end of the arm and assists in positioning the arm through pinion 18 and torque motor 20. The novel leader 22 is shown engaged about the outer layers of tape on the roll.

The transport system includes this supply roll and its support, a central flanged capstan 25, and a take-up hub 28 supported for rotation on a spindle 29 which is carried on an arm 30. The arm is pivotally supported at 32, and is linked to a rack 33 which engages a pinion 34 on a second torque motor 35.

Details of a suitable flange construction for the capstan are shown in copending application Ser. No. 705,405, filed on Feb. 14, 1968, now U.S.Pat. No. 3,468,497, and a constant speed reversible capstan drive is disclosed in copending application Ser. No. 705,406, filed on Feb. 14, 1968, now U.S. Pat. No. 3,586,945. The capstan is thus rotated in either direction at a predetermined constant speed during recording operations, and is rotated at a slower speed for threading.

Figure 3:
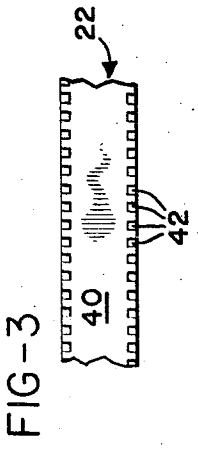
FIG. 3 is an enlarged detail showing a segment of the leader.
Figures 4, 5:
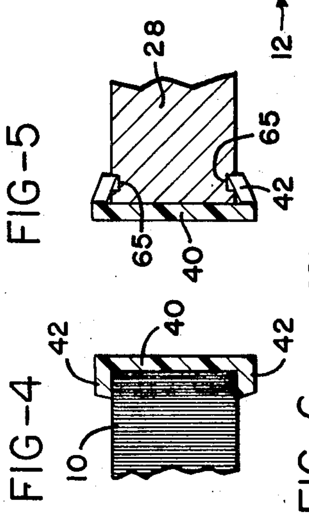
FIG. 4 is a cross-section view showing the leader gripping the outer layers of tape on the supply roll.
FIG. 5 is a cross-section view showing the leader engaged with the take-up hub.

Thp supply roll 12 has a specially constructed leader 40 fastened to the outer end of the tape 10. As shown in FIGS. 3–5, this leader includes a body formed of thin flexible material, such as polypropylene. Flange means are formed on opposite edges, preferably in the form of a large number of small independently flexible teeth 42. The space between the tips of the flange means is slightly less than the width of the tape 10, and the space between the root of the teeth is slightly greater than the tape width such that the leader will embrace several of the outer layers of tape when the roll 12 is completely wound.

The teeth 42 angle inward where they connect to the body 40 of the leader. This construction is best seen by reference to FIGS. 4 and 5. It will be noted particularly in FIG. 4 that when the leader is wound about the outermost layers of the tape, the teeth flex outwardly somewhat, thus there is sufficient compressive force tending to press the teeth against the edges of the tape layers, thereby holding the leader in place and maintaining secure the end of the tightly wound tape roll.

Figure 6:
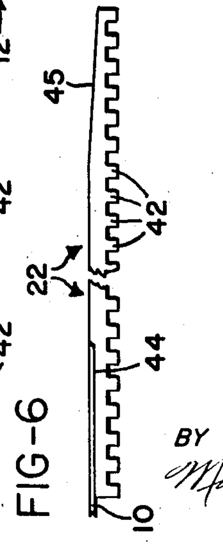
FIG. 6 is a broken side view of the leader, showing details of its opposite ends.

With reference to FIG. 6, the tail end of the leader is provided with a milled or recessed section 44 into which the end of the tape 10 is fastened. In a typical embodiment the length of the recessed section 44 is about 3 inches, and the recess is approximately 1.5 mils in depth, this being approximately the thickness of the tape 10. Thus, the tape is joined to the leader in such manner that the back surface of the tape, in other words that surface opposite from the recording surface, is flush with the back surface of the leader 22. At the leading edge of the leader, there is a tapered or ramp-like configuration 45 which at the leading edge of the leader, provides a relief of approximately 1 ½ mils, equal to the depth of the recess 44, and progressing smoothly outward to the back surface of the leader. The length of the leader 22 is chosen to correspond to the circumferential dimensions of the take-up hub 28, thus the leader wraps exactly once around the takeup hub, as will be fully explained hereafter, and the first layer of the tape 10 is guided smoothly along the leading edge ramp 45 to provide an essentially continuous outer surface as the take-up roll is formed, thereby eliminating bumps or irregularities. It has been found that in some instances this ramp 45 is unnecessary, since the tape 10 being wound under tension will tend to wrap fairly smoothly between the leading and trailing edges of the leader, however the ramp construction aids in smoothing this transition.

As shown in FIG. 1, a control arm 50, pivoted at 51, carries a roller 52 which engages the outermost surface of the take-up roll. A spring 53, anchored between the base of the transport and the arm 50, provides a force tending to move the take-up roll away from the capstan, and this force may be countered by the torque motor 20. Similarly, a control arm 55, pivoted to the base at 56, carries a roller 58 which rides against the surface of the take-up roll. A spring 59 is anchored at one end of the base and is attached to the arm 55 tending to pull the roller 58 and urge the take-up roll away from the capstan, and this action may be resisted by the torque motor 35. The purpose of these control arms and rollers is more fully explained in copending application Ser. No. 705,478, filed Feb. 14, 1968, now U.S. Pat. No. 3,489,369. Preferably, since the transport arrangement may be reversible, whichever roll is acting as the supply roll is held slightly away from the capstan surface by its associated roller, while that roll functioning as the take-up is urged into contact with the capstan by its torque motor, overcoming the force of the control spring. The take-up roll is thus driven by the capstan.

These control arms are illustrated and described herein because the roller 58 cooperating with the take-up hub 28 also assists during the self-threading operation in guiding the leader against the take-up hub.

As shown in FIG. 1, the transducer T is withdrawn from its normal position contacting the tape moving along with the rotating capstan 25, and a self-threading guide and stripper 60 is shown in its forward position, extending between the supply roll and the take-up hub, and into the region between the capstan flanges. This guide is carried on posts 62 which are raised and lowered by a suitable mechanism (not shown) to move the guide into and out of threading or forward position when the transducer is withdrawn. The motion of the guide 60 is such that for threading it is advanced into the space in the front face of the capstan, and then moved slightly inward to extend between the capstan flanges and into close cooperation with the leader and following length of tape.

As explained in the above-mentioned application Ser. No. 705,406, the capstan drive operates at a lower or threading speed during this operation. Once the threading operation is completed, the guide 60 is again withdrawn and the transducer T is moved into contact with the tape 10 by the capstan 25, for either recording or playback operations.

The take-up hub 28 preferably is provided with top and bottom grooves or recesses 65 (FIG. 5) which are formed at the sides of the rim of the take-up hub, spaced from the outer face of the hub by a distance generally corresponding to the length of the leader teeth 42. These recesses thereby form an anchorage into which the leader teeth can extend, as shown in FIG. 5, to assist in forming a secure grip between the leader and the take-up hub. Again, the recesses are not an essential feature, but are preferable to promote a positive engagement with the leader of the take-up hub.

As shown in FIG. 2, the transducer T has been moved into contact with the tape 10 being carried around the capstan 25, and the leader has been completely wound on the hub 28. The region where the trailing edge of the leader adjoins the leading or forward edge of the leader is indicated at 67, and in this region the tape is wound firmly and smoothly about the back face of the leader, thereby producing a roll on the take-up hub which is essentially continuous and without any bumps or irregularities of sufficient depth or abruptness to interfere with the smooth rolling contact between the layers of the tape built up on the take-up hub and the capstan surface. This is desirable since any bumps or irregularities tend to reflect the rolling contact between the capstan and the take-up roll, causing disturbances in the transport system which are reflected as irregularities in the tension on the tape 10. These disturbances in turn may interfere with the proper recording or playback of the information through the transducer T.

The control switches 70 and 71 are illustrated schematically in FIG. 1 to indicate that when the quantity of tape on the take-up roll is depleted to the point where the arm 15 engages the actuator of switch 70, the capstan drive can be automatically reversed, and the tape then moved in the opposite direction. The functions of the supply and take-up roll are then reversed, and the drive continues in the other direction until arm 30 engages switch 71, which may signal a further reversing operation, assuming that a number of different longitudinal tracks are to be scanned on the tape. It will be understood that the transducer T can be moved appropriately to different tracks on the tape, or it can incorporate a number of individual transducer elements, which are switched into appropriate circuits depending upon which track is being used.

Figure 7:
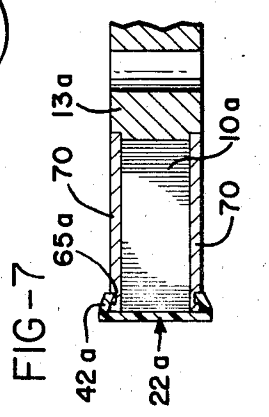
FIG. 7 is a cross-section showing a modified roll with flanges.

FIG. 7 illustrates a somewhat different embodiment of the invention wherein the supply roll includes a hub 13*a* having outwardly extending flanges 70 guiding and surrounding the edges of the layers of tape 10 on the roll. The leader 22*a* in this case is of somewhat greater width, the space between the root sections of the teeth 42*a* being slightly greater than the space between the outer surface of the flanges 70. These flanges may also be provided with similar recesses 65*a* into which the teeth can engage. In this embodiment the circumference of the flanges 70 can be matched, if desired, to the circumference of the take-up hub, thus the leader threads and forms one full layer around teh take-up hub, and similarly it can form one complete outer layer around the supply roll shown in FIG. 7. The leader thus may function also as a protective cover around the supply roll in addition to performing its self-threading function.

While the form of apparatus herein described constitutes a preferred embodiment of the invention, it is to be understood that the invention is not limited to this precise form of apparatus, and that changes may be made therein without departing from the scope of the invention.

What is claimed is:

1. In combination with a roll of recording tape adapted for threading onto the hub of a take-up spindle, a leader having a flexible body with a trailing end fastened to the outermost end of the tape, said leader having a length corresponding to the circumferential dimension of the hub so as to form a layer of constant thickness about the entire hub when attached thereto, and flange means integral with and extending from both edges of the side of said leader body arranged to contact the hub, said flange means being spaced width-wise of said leader by an amount corresponding to the peripheral thickness of the hub and at least one of said flange means being flexible sufficiently that said flange means will grip around the rim of the hub when pressed against it.

2. A leader for a roll of tape as defined in claim 1, wherein said one of said flange means comprises a plurality of independently flexible teeth each individually capable of gripping the hub rim.

3. A leader as defined in claim 2, wherein both said flange means are comprised of a plurality of independently flexible teeth.

4. A leader as defined in claim 1, wherein said flange means extend outwardly from said leader body by a distance sufficient to embrace several of the outermost layers of the tape when said leader is wound about the roll to which it is attached.

5. A combination as defined in claim 1, wherein said leader includes a recess in its trailing edge having a depth equal to the thickness of the tape and having the end of the tape located in said recess and fastened to the leader over a substantial portion of the recess.

6. A combination as defined in claim 5, wherein said leader has a tapered ramp portion formed on that side of its leading end opposite from said teeth to guide tape wound over said leader smoothly across the adjacent ends of the leader wound on the hub.

7. A combination as defined in claim 1, including flanges on the roll extending along opposite sides of the tape layers, the outer surfaces of said flanges being spaced apart a distance corresponding to the spacing between said leader flange means, whereby said leader will extend about and grip the edges of said flanges when the roll is fully wound.

8. In a self-threading transport system for recording tape, the combination of a supply spindle and a take-up spindle mounted in spaced relation, a supply roll carried on said supply spindle having a length of recording tape thereon including a leader extending from the outermost end of tape, said leader having flexible flange means extending therefrom and engaged about the outermost layers of tape on said supply roll to hold the same in a rolled condition, said take-up spindle including a take-up hub having a rim with a thickness corresponding to the width of the leader between its said flange means for gripping by said leader, said leader being of a length equal to the circumference of said take-up hub, and means for stripping said leader from said supply roll and guiding said leader into contact with said take-up hub whereby said flexible flange means automatically will grip the rim of said take-up hub.

9. A self-threading system as defined in claim 8, wherein said take-up hub includes a recess formed around at least one side of said rim to receive a portion of said flange means.

10. A self-threading system as defined in claim 8, wherein at least one of said flange means comprises a plurality of independently flexible teeth each individually capable of gripping said outer layers of tape or said rim.

11. A pliable tape record medium adapted to be coiled to form a roll thereof, said record medium comprising an information record portion and a leader portion, said leader portion being formed to include, as a continuously attached portion thereof, gripping means carried along the leader portion in position for engaging portions of the side edges of convolutions of the roll of tape to retain the outermost convolution of the roll in its coiled position.

* * * * *